United States Patent

[11] 3,596,614

| [72] | Inventors | Richard S. Smith<br>Palo Alto;<br>Dale A. Furlong, Sunnyvale; Ronald D. Kinsey, Cupertino, all of, Calif. |
|---|---|---|
| [21] | Appl. No. | 756,593 |
| [22] | Filed | Aug. 30, 1968 |
| [45] | Patented | Aug. 3, 1971 |
| [73] | Assignee | Combustion Power Company, Inc.<br>Palo Alto, Calif. |

[54] FLUID BED REACTOR MATERIAL COMBUSTION APPARATUS
2 Claims, 5 Drawing Figs.

[52] U.S. Cl. .................................................. 110/8 P, 110/28 J
[51] Int. Cl. ............................................................ F23g 5/00
[50] Field of Search .......................................... 110/8, 165; 55/126, 315; 60/39.5; 110/28

[56] References Cited
UNITED STATES PATENTS

| 2,958,298 | 11/1960 | Mayers | 110/28 |
| 2,911,065 | 11/1959 | Yellott et al. | 110/165 |
| 3,320,906 | 5/1967 | Domahidy | 110/8 |
| 3,411,465 | 11/1968 | Shirai | 110/8 |
| 3,418,788 | 12/1968 | Sugimoto | 55/126 X |

FOREIGN PATENTS

| 950,721 | 2/1964 | Great Britain | 55/126 |

*Primary Examiner*—Edward G. Favors
*Attorney*—Limbach, Limbach & Sutton

ABSTRACT: A material combustion method and apparatus is disclosed wherein material to be combusted is directed into a fluid bed reactor, compressed air directed through the fluid bed and entrained particles removed from combustion gases evolved during combustion.

INVENTORS
RICHARD D. SMITH
DALE A. FURLONG
RONALD D. KINSEY

BY *Limbach and Limbach*
ATTORNEYS

FLUID BED REACTOR MATERIAL COMBUSTION APPARATUS

The invention described herein was made in the course of or under a contract with the Department of Health, Education and Welfare.

The present invention relates in general to a material combustion method and apparatus and more particularly to a fluid bed reactor combustion method and apparatus.

Broadly stated, the present invention, to be described in greater detail below, is directed to a material combustion method and apparatus wherein a combustion chamber is provided with a bed of inert particles, material to be burned is fed into the bed, compressed air directed through the bed and particles entrained in the combustion gases evolved from the bed collected and removed.

This invention provides a system wherein materials, such as solid waste and the like, can be substantially entirely disposed of efficiently and economically, and enables the efficient utilization of the energy from the waste material.

In the fluid bed reactor, the burning rate is greatly increased over the burning rate of conventional assemblies by reason of the increased pressure, large radiation surface, continual abrasion, and continual mixing.

In accordance with still another aspect of the present invention the particle separators for removing ash entrained in the exhaust gases include the combination of an inertial separator followed by an electrostatic precipitator or mat filter. In accordance with this construction the inertial separators remove all but the smallest particles from the exhaust gases, and these small particles are removed by the electrostatic precipitator or mat filter, thereby providing a very efficient combination.

In accordance with another aspect of the present invention, when employed in combination with a compressor-turbine assembly to form a gas turbine, it allows the gas turbine to burn low grade (hence inexpensive) liquid fuels and solid fuels as well as solid wastes. These fuels are not normally burned in gas turbines.

These and other features and advantages will become more apparent upon a perusal of the following specification taken in conjunction with the accompanying drawings wherein similar characters of reference refer to similar structures in each of the several views.

Figure 1:
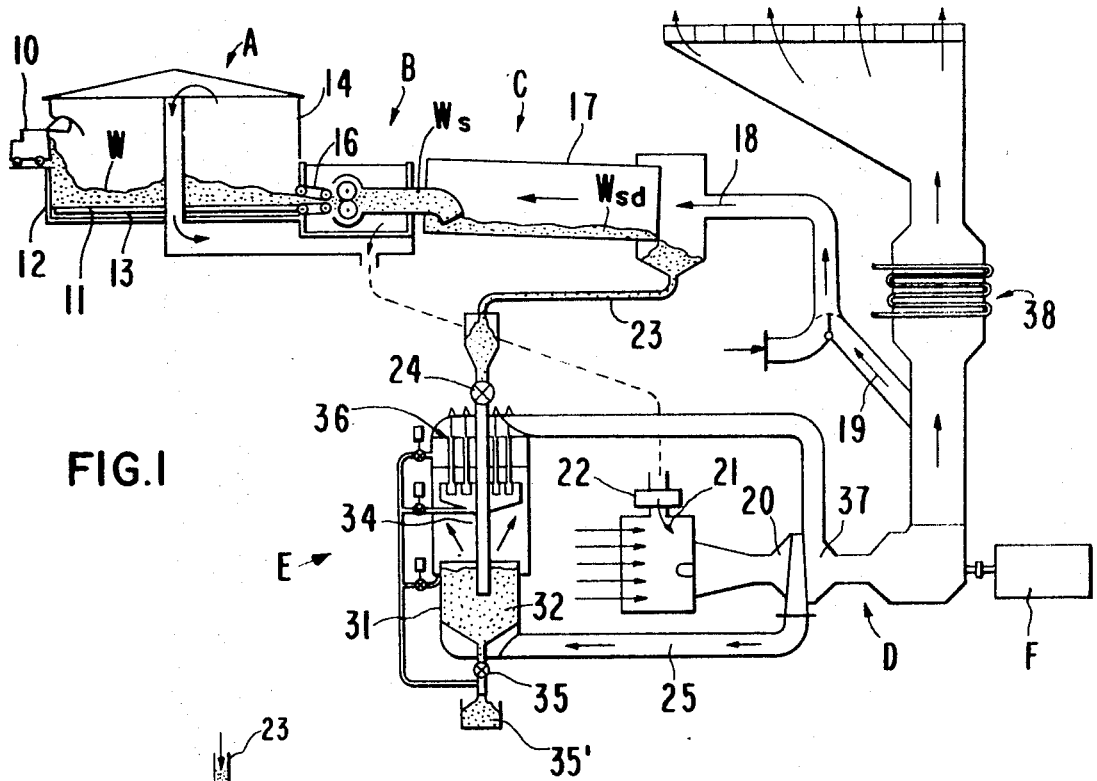
FIG. 1 is a schematic flow diagram of a waste disposal system and illustrates the operation of several different aspects of the present invention.

While the present invention is utilizable for consumption of a variety of materials in a variety of processes, it is particularly adaptable for use in a solid waste disposal system. Therefore, by way of illustrative example, the present invention will be described with reference to use in such a solid waste disposal system.

Referring now to the drawings, there is shown in schematic form a solid waste disposal system and different utilizations thereof. As schematically illustrated, the solid waste disposal system utilizes a waste receiving and storage assembly A in accordance with the present invention, a shredding assembly B, a drying assembly C, a compressor-turbine assembly D, a combustion assembly E, and an electric generator assembly F.

The solid wastes are typically received from municipal collection trucks 10 which dump the waste into the receiving and storage assembly A which includes a circular turntable or carousel 11 floating on a pond of water 13 within a hollow cylindrical housing 12 with suspended glass cloth panels 14 permitting truck access to the carousel and with the carousel rotatable to feed the solid wastes W into the shredding assembly B. The carousel 11 can be raised and lowered to assist refuse dumping and feeding operations by adjusting the level of pond 13 thereby eliminating the need for a crane and associated high-bay construction in the solid waste storage area. A large effective tipping area for the collection trucks 10 is provided by the circular shape of the carousel 11 and the panels 14 screen off the storage area while permitting an inflow of fresh air.

The solid wastes W are directed by a fixed leveling blade 15 over the carousel 11 into conveyors or a chute 16. The turntable elevation and the rotational speed can be controlled automatically or remotely controlled by an operator in the central control room of the waste disposal plant where the operator observes the carousel operation by closed circuit television.

In the shredding assembly B, all of the solid wastes W are shredded to form a more nearly homogeneous shredded material $W_s$ which is easily transported through the remainder of the system by conventional automated devices for materials handling. The shredded solid wastes $W_s$ are dried in the drying assembly C to increase the burning rate of waste in the overall system and eliminate the variability in burning rate resulting from widely different moisture contents. The heat utilized in the drying assembly C is provided by a heated air stream 18 which obtains its heat from a portion of the exhaust gases 19 from the gas turbine assembly D.

The compressor-turbine assembly draws at least a portion of its compressor intake air 21 through a filter 22 from the airspace above the waste in the receiving and storing, shredding and drying assemblies, A, B, C, respectively, to prevent dust and odors from escaping to the environment. The shredded and dried solid waste $W_{sd}$ is transported via a conduit 23 and fed into the high-pressure environment of the combustion chamber assembly E such as by a rotary feeder 24.

In the compression portion 20 thereof, the compressor-turbine assembly D compresses the intake air 21 from the other assemblies and from the outside environment to elevated pressures and temperatures such as 100 p.s.i.a. and 584° F. or 200 p.s.i.a. and 700° F. This hot high-pressure air is ducted via conduit 25 to the combustion chamber assembly E to provide the oxygen for combustion of the solid wastes.

Figure 2:
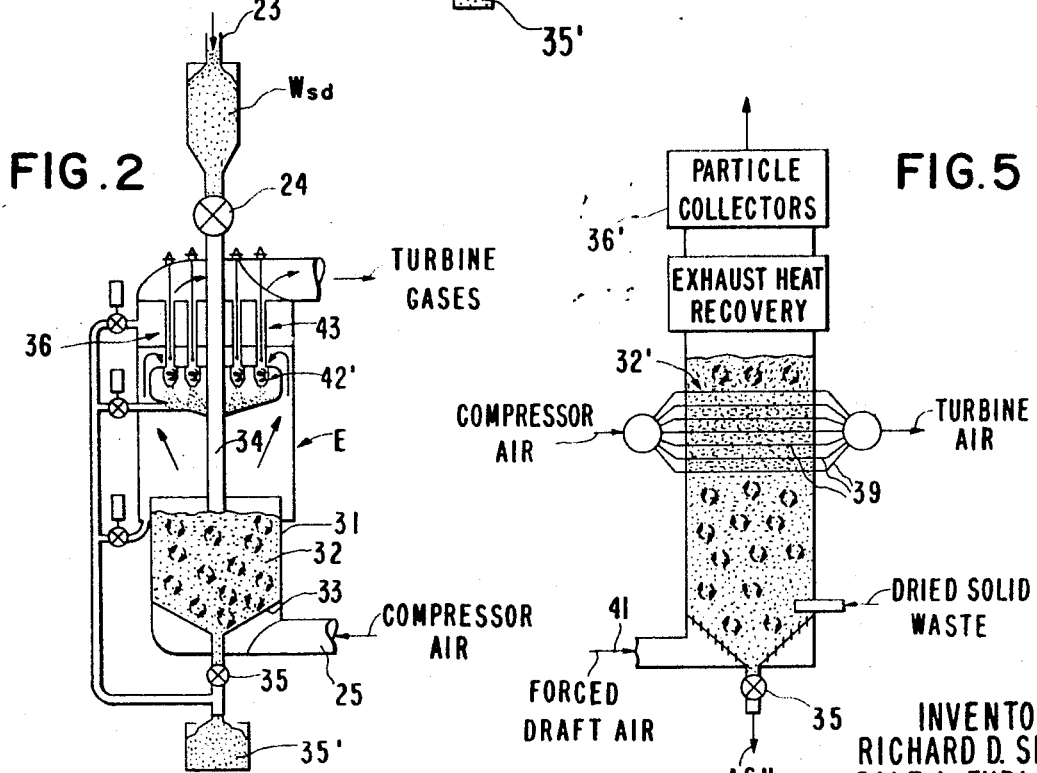
FIG. 2 is an elevational schematic view of a fluid bed reactor operable with the present invention.
Figure 5:
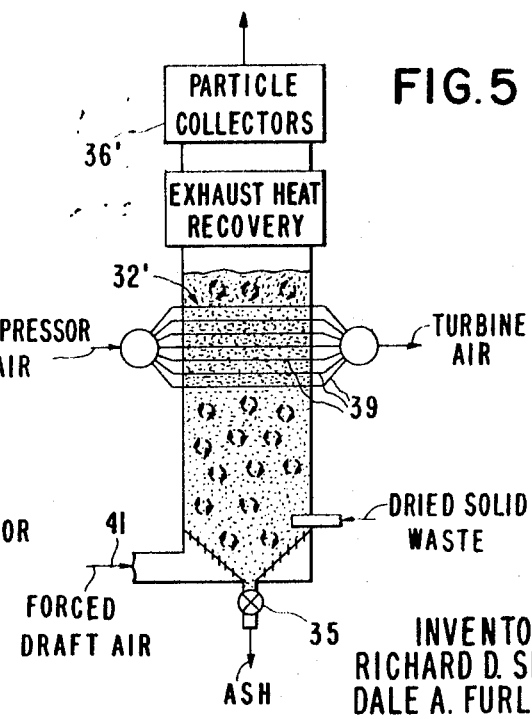
FIG. 5 is a schematic block diagrammatic view of an alternative fluid bed reactor system in accordance with the present invention.
Figure 3:
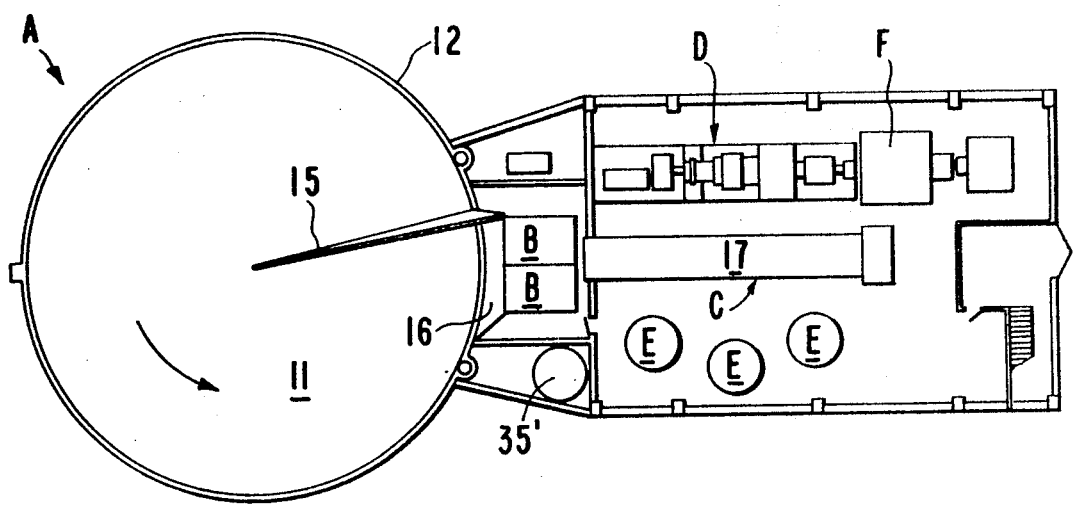
FIG. 3 is a plan view of a waste disposal system utilizing the present invention.
Figure 4:
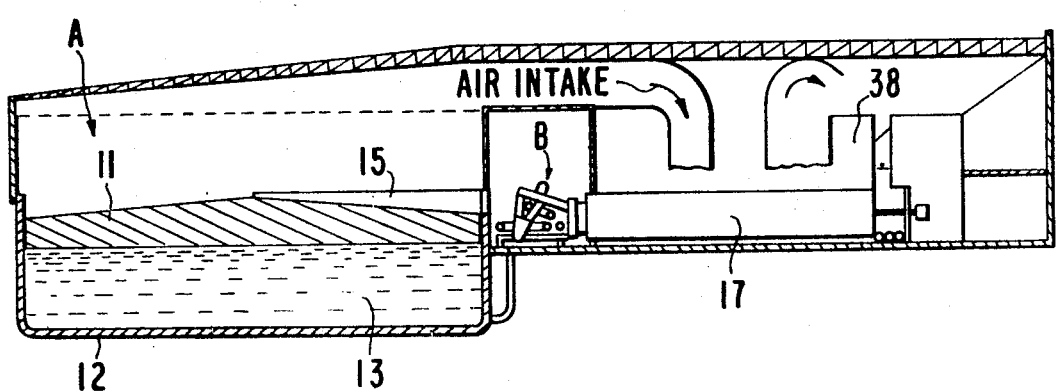
FIG. 4 is an elevational view, partially in section, of the embodiment illustrated in FIG. 3.

The combustion chamber assembly illustrated in FIG. 1 and in enlarged scale in FIG. 2 includes a combustion chamber 31 in the form of a fluid bed reactor. Sand or other inert particles 32 are contained within the chamber 31 above a porous grate 33 and suspended or fluidized during operation by passing air therethrough. Limestone or dolomite can be added to the particle bed for control of noxious gases. The shredded dried waste $W_{sd}$ is injected directly into the bed of particles 32 by a conduit 34 from the rotary feeder 24. This bed of particles 32 is initially heated by an external source (not shown) to an elevated temperature for combustion of waste material and combustion is maintained with the compressed hot gases from the compressor-turbine assembly D passing into combustion chamber 31 from conduit 25 and through the grate 33.

The fluidized bed promotes dispersion of the incoming shredded and dried solid waste which is heated to ignition temperature and maintained in the bed a sufficient time for combustion of all burnable solid waste particles. The particles are selected within suitable range of size, shape and density and of a material to withstand high temperatures without slagging and the air is caused to flow through the particles under carefully controlled conditions. Chief among these conditions is the necessity that the fluid velocity through the bed, and hence the pressure drop, be greater than the value required to support the bed weight but less than the value required to sweep the particles out of the chamber. When these conditions are satisfied, the bed particles exist in a fluidized state. If the movement of one specific particle could be observed, it would undergo a continuous turbulent motion, being bouyed by flowing fluid and not at rest against adjacent particles. Superimposed upon this localized motion are convection motions of the entire bed. Viewed as a whole, the dynamic condition of a fluidized bed is quite analogous to that of a boiling liquid.

The high pressure and turbulence in the fluid bed reactor combine to promote rapid combustion of the solid wastes. Thus, the fluidized inert material promotes dispersion of the incoming shredded solids, heats the solid waste to ignition temperature, and maintains residence time sufficient for combustion of all burnable solid waste particles within the reactor. The fluid bed will hold a kleenex long enough for it to be burned without escaping while at the same time heavy chunks of rubber will remain in the bed until finally consumed. Large pieces of inert material will sink to the bottom of the bed and be removed from the fluid bed through an air lock feeder 35 and combined with other ash in a residue storage 35'.

The burning rate of this combustion chamber assembly in accordance with the present invention is greatly increased over the burning rate of conventional assemblies by reason of the increased pressure for availability of additional oxygen, increased heat transfer to the solid waste by the radiation from the large surface area of the particulate matter and convective heat transfer from the hot gas, the large direct contact surface area of the waste due to shredding, the continual abrasion of the charred surface by the bed material to expose virgin waste surface, and the continual mixing of gases in the bed enhancing the flow of gases to and from the burning solid surface thereby enhancing the completeness and rate of gas phase combustion reaction.

Most of the ash remaining after combustion is complete will be carried off with the gases leaving the fluid bed surface and subsequently collected by particle collectors 36. The ash particles and inerts from the solid waste which are larger or more dense than the inert particles 32 forming the bed eventually reach the bottom of the fluid bed reactor in the combustion chamber where they are removed by the rotary air lock 35.

In addition to the advantages of the high-pressure fluid bed combustor mentioned above, the highly uniform temperature, the presence of CaO and MgO in the ash or the addition of limestone or dolomite, greatly reduce the air pollution from burning of solid wastes. The thorough mixing of the fluid bed maintains a highly uniform temperature so that few nitrogen-oxygen compounds, formed when nitrogen and oxygen gases are exposed to elevated temperatures, are formed. The CaO and MgO in the ash or limestone or dolomite suppresses evolution of sulfur dioxide and other acid vapors by chemically combining with the acids to form a salt. Although solid waste has a relatively low sulfur content (0.1 percent) compared to petroleum or bituminous fuels, it contains polyvinylchloride plastic which evolves hydrochloric acid vapor when burned. The fluid bed combustor is ideally suited to the efficient utilization of the natural properties of the ash or of limestone or other suppressant because this material would be retained in the bed and the chemical reactant continuously removed from the suppressant by the fluid bed turbulence.

The hot gases leaving the fluid bed 32 entrain many ash particles which must be removed such as by the particle collectors 36 before the gases are allowed to enter the turbine. Large particulate matter, if allowed to pass through the turbine, will damage the turbine severely. Gas cleaning by the particle collectors 36 and accomplished for the turbine also satisfies the clean air requirements for exhaust gases. The particle collectors can take a number of different forms such as inertial separators, electrostatic precipitators and mat filters. The particle collectors 36 in FIGS. 1 and 2 are schematically illustrated as a combination of inertial separators 42' followed by electrostatic precipitators 43. The inertial separators 42' remove all but the smallest particles, and these small particles are removed by the electrostatic precipitators 43.

Inertial separators use centrifugal force to separate particles from the gas stream and can provide efficiencies of 97.8 percent and greater for particles as small as 10 microns in diameter, but the efficiency degrades for particles smaller than this size. The fine particles which tend to follow the air flow out of inertial separators are least likely to injure the turbine. Inertial separators are particularly suited for use in the first stage of a two stage separator because they efficiently remove large particles, leaving only the fines for the second stage.

Electrostatic precipitators directly charge the particles in the gas and subsequently attract them to a surface charged with opposite polarity. Since the forces of separation are applied directly to the particles without disturbing the gas flow, all sizes of particles are collected efficiently; however, the high collection efficiency for the fine particles (5 microns and below) is particularly good. As temperature is increased in an electrostatic precipitator, the electrical characteristics of the hot gas change due to molecular action, and it becomes more difficult to charge the dust particles. Fortunately, increased pressure as utilized in the air chamber of the present invention tends to offset this characteristic. Mat filters have excellent collection efficiency for both coarse and fine particles and filter material is available made of fine fibers (5 to 7 microns in diameter) of silicon dioxide and aluminum oxide which can be used as filter material up to 2300° F.

The hot gases leaving the particle collectors 36 are expanded through the expansion and drive portion 37 of the compressor-turbine assembly D which drives the compressor portion 20 of the assembly D, and drives the electric generator assembly F to produce electric power.

The hot gas leaving the compressor-turbine assembly D is near atmospheric pressure but at elevated temperature so that the portion 19 can be utilized for drying shredded solid waste material in the drying assemble C as described above. If solid waste has a moisture content of 20 percent and this moisture is boiled out in the dryer, less than 10 percent of the exhaust gases need be recirculated. An optional exhaust heat recovery boiler 38 can be provided in the exhaust line from the gas turbine for utilization of the heat for producing steam for heating, air conditioning, or desalting water. The hot exhaust gas is decelerated in an enlarged exhaust plenum and released to the atmosphere from a large area in the roof of the plant.

Use of the gas turbine cycle for waste collection allows performance of many services to the community besides incineration of solid wastes. For example, the capability of the gas turbine compressor can be utilized to draw a powerful vacuum and suck the solid waste through underground pipes and deposit this waste in the carousel for combustion in the disposal system. Alternatively, the exhaust heat from the gas turbine can be utilized to produce fresh water daily from saline or brackish water. Still further, the disposal system can be utilized to incinerate the sewage sludge resultant from sewage systems.

In the modern field of power generating equipment, the gas turbine is most suited for the capacity range of 5 to 30 megawatts, above diesel and gas engine generators for lower powers and below steam turbine generators for high powers. The present invention is specifically designed for providing as an advanced incinerator a compact module consuming between 200 and 800 tons per day and generating through an electric generator between 7 megawatts and 30 megawatts of electric power. By way of example, several gas turbines are presently available in the 15 megawatt capacity and correspond to a solid waste disposal capacity of 400 tons per day, approximately in the middle range of interest. A 400 ton per day unit will dispose of solid wastes from approximately 150,000 people, for their entire population San Francisco would require 5 units of this size, New York would require 40 units. Such a unit will dispose of solid waste for 95 cents per ton, approximately one-half the cost of sanitary land fill and 16 percent of the cost of modern conventional incinerators. Additionally, such a unit can supply 5 to 10 percent of the electric power requirements of the community serviced by the incinerator. By using a carousel storage volume 15 feet deep with an inside diameter of 80 feet, 2,790 cubic yards of solid waste can be stored which supports over 26 hours of continuous operation of the 400 ton per day disposal unit. Also, such a 400 ton per day unit will operate with 2 fluid bed reactors (plus a spare for emergencies) each operable with a maximum air flow of 100 pounds per second and solid waste feed rate of 200 tons per day. Typical reactors can have a diameter of 10 feet, a reactor bed depth of 3 feet, an average air velocity of 12 feet per second and a reactor pressure drop of 6 p.s.i. Such reactors have a heat release rate of 500,000 B.t.u. per hour for each cubic foot of fluid bed and a heat release rate of 1,000,000 B.t.u. per hour per square foot of area.

In accordance with another aspect of the present invention, an alternate configuration for the fluid bed reactor as shown in FIG. 6 is provided. In this arrangement, the compressor air from the compressor portion of the compressor-turbine assembly D is heated by passing through pipes 39 immersed in the fluid bed 32' with the heated air from these pipes then expanded through the expansion and drive portion 37 of the compressor-turbine. Since the combustion process takes place outside these pipes 39 rather than directly in the gas that passes through the turbine, the process of this aspect of the present invention can be considered as external combustion. Air 41 is supplied to the external fluid bed reactor 32' by a forced draft fan (not shown). Only enough excess air 41 is supplied to insure complete combustion, and thus the weight flow rate of air passing through the fluid bed reactor is approximately one-fifth that passing through the gas turbine. To minimize the heat transfer area, the bed is operated as hot as possible such as 1900° F without slagging the ash. Since the combustion gases do not pass through the gas turbine, they may be cooled prior to particle collection.

An external fluid bed reactor constructed in accordance with this embodiment of the present invention can provide a solid waste disposed rate of about 250 tons per day with an average air velocity of 5 feet per second in a bed area and volume of 3880 Ft.² and 930 Ft.³ respectively, with a heat release of over 100,000 B.t.u. per cubic foot utilizing a forced draft fan power of 610 horsepower.

While the present invention is ideally suited for combustion of solid waste in a waste disposal plant using a gas turbine, it is also ideally suited for operation in combination with the compressor-turbine assembly, forming thus a gas turbine which can be operated with Bunker C, coal, and other low grade fuels not normally suited for burning in a gas turbine. In addition, the inherent pollution suppressant capability of the fluid bed reactor allows fuels with high sulfur content or other pollutants to be burned without polluting the atmosphere.

Although the foregoing invention has been described in some detail by way of illustration and example for purposes of clarity of understanding, it is understood that certain changes and modifications may be practiced within the spirit of the invention as limited only by the scope of the appended claims.

What we claim:

1. An assembly for burning material and performing work with the combustion gases at elevated temperature comprising:
   a combustion chamber,
   a bed of incombustible inert particles positioned within a portion of said chamber,
   dolomite or limestone air pollution suppressant particles in said particle bed,
   a conically downwardly depending porous grate provided in said chamber beneath said particle bed for passing combustion gases into said particle bed,
   means for feeding compressed gases into the base of said chamber for passage through said grate into said particle bed,
   means for feeding material for burning into said particle bed whereby material is substantially burned in said particle bed,
   meaNs located within another portion of said chamber for collecting at substantially the combustion temperature particles from the gaseous combustion stream evolved in burning said material,
   means for directing the cleaned combustion stream from said particle collection means for performing work, and
   means for directing at least certain of the working combustion stream to atmosphere.

2. An assembly for burning material and performing work with the combustion gases at elevated temperature comprising:
   a combustion chamber,
   a bed of incombustible inert particles positioned within a portion of said chamber,
   dolomite or limestone air pollution suppressant particles in said particle bed,
   a conically downwardly depending porous grate provided in said chamber beneath said particle bed for passing combustion gases into said particle bed,
   a compressor-turbine assembly including means for compressing and heating air for combustion of material,
   means for feeding material for burning into said particle bed whereby material is substantially burned in said particle bed,
   means for feeding compressed air from said compressor-turbine assembly into the base of said chamber for passage through said grate into said particle bed,
   means at the lower portion of said downwardly depending grate for collecting and removing unburnable portions of said material from said combustion chamber,
   means located within another portion of said chamber for collecting at substantiaLly the combustion temperature particles from the gaseous combustion stream evolved in burning said material,
   means for directing the cleaned combustion stream from said particle collection means to said compressor-turbine assembly,
   means for expanding said cleaned combustion stream in said compressor-turbine assembly to produce shaft work and power, and
   means for directing at least certain of the working combustion stream in said compressor-turbine assembly to atmosphere.